Patented Dec. 1, 1936

2,062,377

UNITED STATES PATENT OFFICE 2,062,377

PROCESS FOR THE REMOVAL OF GUM-FORMING CONSTITUENTS, SULPHUR COMPOUNDS AND COLOR COMPOUNDS FROM NAPHTHA

Helmuth G. Schneider, Elizabeth, N. J., assignor to Standard Oil Development Company, a corporation of Delaware No Drawing. Application January 10, 1934, Serial No. 706,073

3 Claims. (Cl. 196—44)

This invention relates to the treatment of naphthas for the production of gasoline with boron fluoride and other halides of similar chemical properties. The naphtha may be of petroleum origin, such as straight run or cracked naphtha, or it may be a naphtha produced by the distillation of shales, naphthas produced by low temperature carbonization or by hydrogenation of coals, etc. The treating agent may be boron fluoride or other halides of boron, such as boron chloride, bromide and iodide, the halides of titanium such as titanium tetrachloride, the halides of silicon such as silicon fluoride and the halides of tin. The best results for the production of a finished gasoline are obtained by treatment of cracked petroleum naphthas with boron fluoride. The invention will be fully understood from the following description.

I have found boron fluoride and the other halides of similar chemical properties mentioned to be highly selective refining agents in that very small quantities, if properly distributed, in a naphtha successfully remove objectionable constituents. Because of the high activity of boron fluoride and similar treating agents, it is necessary to distribute small quantities of the treating agent throughout the naphtha in a short period of time. This is achieved by thoroughly agitating the naphtha while the treating agent is incorporated. The treating may be carried out at atmospheric temperature, at higher than atmospheric temperature and also at lower than atmospheric temperature; for example, at —40° F. The pressure may be atmospheric or higher than atmospheric.

The treating agent may be incorporated in the naphtha directly, such as, for example, by introducing boron fluoride gas into the naphtha, or a solution of the treating agent in substantially 100% sulphuric acid, or other liquid refining agent may be used.

The main improvements obtained by treating naphtha with a halide of the class mentioned are: Improvement of the color of the naphtha, reduction of its gum content and also reduction of the sulphur content of the naphtha by removal of the mercaptans. The treating consists in agitating the naphtha with the treating agent, settling and separating the sludge from the treated naphtha. Filtration may be used to remove all traces of sludge.

The amount of the treating agent may vary within broad limits, thus, for example 0.06–0.15 lb. or more of boron fluoride per barrel of naphtha usually gives satisfactory results, while larger amounts such as 2–4 lbs. of titanium tetrachloride per barrel of naphtha are often necessary for the same purpose. After the separation of the sludge the naphtha is preferably washed with water, neutralized and distilled to obtain an end point gasoline.

The following examples will illustrate the present invention:

A cracked distillate of +9 Saybolt color and 180 mg. copper dish gum is treated with one ounce of boron fluoride gas per barrel of naphtha. After the separation of the sludge, washing and neutralizing, a gasoline is obtained having a +30 color and 9 mg./100 cc. copper dish gum. In this case, therefore, the treatment with one ounce of boron fluoride is found to be approximately equivalent to a treatment with 4 lbs. of 66° Baumé sulphuric acid per barrel of the distillate.

Another cracked naphtha of +9 Saybolt color and 58 mm. per 100 cc. of copper dish gum is treated with 0.126 lb. per barrel of boron fluoride in a similar manner. The gasoline obtained has a color of +22 and a copper dish gum of 12. The gravity and the octane number of the naphtha has not been essentially altered by the treatment.

Naphthas produced by strenuous cracking in a vapor phase react vehemently with boron fluoride and develop heat during the reaction. It is preferable to treat such naphthas at low temperatures, such as at 0° F. or even as low as —40° F.

The present process may be varied in different ways: for example, sweetening with doctor solution may be the neutralization and distillation steps. The naphtha may also be separated into a lower boiling and a higher boiling fraction, treating only the higher boiling fraction with the treating agent and blending the same with the untreated lower boiling fraction. Other modifications will be apparent to those familiar with the art and, therefore, the invention is not to be limited by the examples given for illustration but only by the following claims, in which it is my intention to claim all novelty inherent in the invention.

What I claim is:

1. The process of treating naphtha for the production of gasoline of improved color and reduced sulphur content and gum-forming tendency which comprises agitating the naphtha with a treating agent belonging to the class consisting of boron fluoride and boron fluoride dissolved in sulphuric acid in the absence of other treating agents of acid nature, the boron fluoride being employed in an amount ranging from 0.06 to 0.15 lb. per barrel of naphtha, and separating the sludge formed from the naphtha.

2. The process according to claim 1 in which the naphtha is treated with boron fluoride gas.

3. The process according to claim 1 in which the naphtha is treated with a solution of boron fluoride gas in substantially 100% sulphuric acid.

HELMUTH G. SCHNEIDER.